United States Patent

[11] 3,626,201

[72] Inventor Charles W. Chambers, Jr.
Amherst, Ohio

[21] Appl. No. 43,751
[22] Filed June 5, 1970
[45] Patented Dec. 7, 1971
[73] Assignee Lorain Products Corporation

[54] POLARITY RESPONSIVE CIRCUIT FOR TELEPHONE SYSTEMS
12 Claims, 2 Drawing Figs.

[52] U.S. Cl. .......... 307/127, 179/16 F
[51] Int. Cl. .......... H04m 19/00
[50] Field of Search .......... 307/127; 317/123 DX, 7, 8; 179/16 F; 320/25, 26

[56] References Cited

UNITED STATES PATENTS

| | | | |
|---|---|---|---|
| 2,055,647 | 9/1936 | Bowne | 179/16.5 UX |
| 2,820,181 | 1/1958 | Bowmen et al. | 317/8 |
| 2,964,682 | 12/1960 | Jansen | 317/8 |
| 3,164,747 | 1/1965 | Yahnke | 317/8 X |
| 3,273,039 | 9/1966 | Godshalk et al. | 307/127 X |
| 3,296,515 | 1/1967 | Knauth | 320/25 X |
| 3,413,487 | 11/1968 | Gershen | 320/26 X |
| 3,458,727 | 7/1969 | Watkins | 307/127 X |
| 3,514,543 | 5/1970 | Rae | 179/16 F |
| 3,527,894 | 9/1970 | Mesenhimer | 179/16 F |
| 3,531,598 | 9/1970 | McNair | 179/16 F |

FOREIGN PATENTS

| | | | |
|---|---|---|---|
| 1,293,215 | 4/1969 | Germany | 307/127 |

*Primary Examiner*—Robert K. Schaefer
*Assistant Examiner*—William J. Smith
*Attorney*—John Howard Smith

ABSTRACT: A circuit for providing a unidirectional DC output voltage from a reversible DC input voltage (for example, talking power in a telephone circuit) and for providing an AC output voltage (for example, ringing power in a telephone circuit) from an AC input voltage. A plurality of diodes are connected in a rectifying configuration between a pair of input terminals and a pair of output terminals when a mode control circuit is in a first operative state in the absence of an AC voltage at the input terminals. A controllable switching network is connected in series with each diode to control the conduction thereof in accordance with the polarity of the voltage at the input terminals. This prevents the uncontrolled conduction of the diodes when the DC voltage at the input terminals is less than the voltage of a DC source which may be connected in series with the output terminals. An AC voltage sensing circuit changes the operative state of the mode control circuit when an AC voltage appears at the input terminals. This change in state causes the mode control circuit to reconnect the diodes in a nonrectifying configuration between the input and output terminals and thereby permit the free flow of an AC current therebetween.

INVENTOR.
CHARLES W. CHAMBERS JR

BY John Howard Smith

POLARITY RESPONSIVE CIRCUIT FOR TELEPHONE SYSTEMS

BACKGROUND OF THE INVENTION

The present invention relates to switching circuits for telephone systems and is directed more particularly to circuits for providing a unidirectional DC output voltage from a reversible DC input voltage.

In providing adequate DC operating current to a plurality of subscriber telephone circuits, it has been the practice to energize most of the subscriber lines directly from a single, centrally located source of DC voltage known as the central office battery. Operating current for the remaining subscriber lines was then supplied by increasing the respective DC operating voltages applied thereto. This increased voltage has usually been provided by connected a DC voltage boosting source in series with each subscriber line either at a central office or locally at a PBX. Each such booster source must, of course, be connected in series-aiding relationship with the central office battery.

Because of the widespread use of reverse battery supervision, that is, the use of reversals in the polarity of the connections between the central office battery and outgoing cable pairs for supervisory and control purposes, it has been the practice to provide circuitry for maintaining a series-aiding relationship between the boost voltage and the central office battery voltage. One advantageous circuit of this type includes a rectifier network connected between the central office equipment terminals and the terminals of the voltage booster source. This network assures that a unidirectional DC voltage is provided to the voltage booster source despite supervisory reversals in the polarity of the central office voltage. To prevent this rectifier network from interfering with the flow of ringing current, switching circuitry can be provided which will bypass the ringing current around the rectifier network when AC ringing voltage is detected.

In circuits of the above type, the problem has been that where the voltage added by the booster source has been larger than the voltage provided to the input of the rectifier network by the central office battery, taking into account line voltage drops between the central office battery and the terminals of the rectifier network, all of the rectifying elements of the rectifier network became forward biased at the same time. This caused the rectifying elements to conduct uncontrollably and thereby effectively short circuit the telephone line. This prevented the transmission of a voice signal in either direction between the central office and the subscriber telephone set.

SUMMARY OF THE INVENTION

Accordingly, it is an object of the invention to provide a polarity responsive switching circuit which affords a unidirectional DC voltage from a DC central office voltage which is subject to supervisory polarity reversals.

Another object of the invention is tor provide a circuit of the above character which does not interfere with the flow of AC ringing current therethrough.

Still another object of the invention is to provide a circuit of the above character which preserves the voice transmission characteristics of the telephone line with which it is used even if the DC boost voltage added between the output of the circuit and the subscriber telephone set is greater than the DC voltage which the central office battery provides to the input of the circuit.

A further object of the invention is to provide a rectifier circuit having a reversible DC input voltage and a unidirectional DC output voltage in which a DC boost voltage source may be connected in series-aiding relationship with the output of the rectifier circuit without disrupting the normal conduction patterns of the rectifying elements within the rectifier circuit.

Yet another object of the invention is to provide a rectifier circuit wherein the conduction of each rectifying element is controlled solely in accordance with the polarity of the input voltage to the rectifier circuit.

DESCRIPTION OF THE INVENTION

Figure 1:
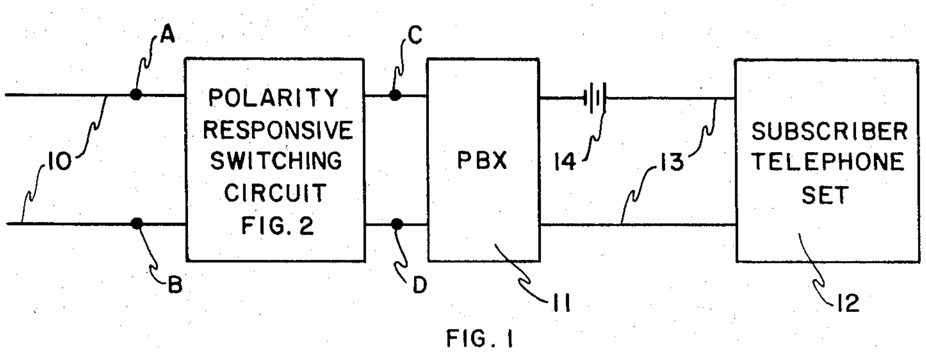
FIG. 1 is a block diagram showing a telephone system environment in which the circuit of the invention may be utilized and FIG. 2 shows a schematic diagram of an exemplary embodiment of the circuit of the invention.

Referring to FIG. 1, there is shown a conductor pair 10 for carrying the incoming call of a calling subscriber. This connector pair terminates at a private branch exchange or PBX 11. An incoming call is answered by a PBX operator who, in turn, directs the call to the telephone set 12 of the called subscriber. This is accomplished by connecting a cord circuit between conductor pair 10 and the conductor pair 13 of the called subscriber.

In incoming conductor pair 10 has a high DC resistance, the DC operating voltage which is supplied to telephone set 12 therethrough may be insufficient to operate telephone set 12. This is because the cord circuit establishes a low-impedance path across conductor pair 10. The current which flows through this path causes a substantial portion of the central office battery voltage to appear as a line voltage drop in conductor pair 10 rather than as a DC operating voltage across the subscriber telephone set. One way of increasing the operating voltage of such a telephone set is to connect a DC boost voltage source in series therewith. The voltage of a booster source so connected must, of course, be in series-aiding relationship to the central office voltage appearing at the PBX.

In order to maintain a series-aiding relationship between the voltage of DC voltage booster source 14 and the central office voltage, despite supervisory reversals in the polarity of the latter, it is necessary either to control the polarity of the added boost voltage in accordance with the polarity of the central office voltage in accordance with the polarity of the central office voltage or to rectify the central office voltage so as to provide a unidirectional voltage in series with the voltage booster source. Polarity control circuits of the former type have been found unsuitable for use with telephone circuits which are connected to the central office through a PBX. Prior to the present invention, circuits of the latter type have been of limited usefulness because the added DC boost voltage had to have a magnitude which was less than the voltage established at the PBX by the central office. This is because a higher boost voltage caused the uncontrolled conduction of the rectifying elements of the rectifier circuit, resulting in an effective short circuit across the subscriber line.

In accordance with the present invention circuitry is provided which will rectify the DC central office voltage, this rectification being accomplished substantially without regard to the magnitude of the DC boost voltage that is to be added in series with the output of the rectifying circuitry.

Figure 2:
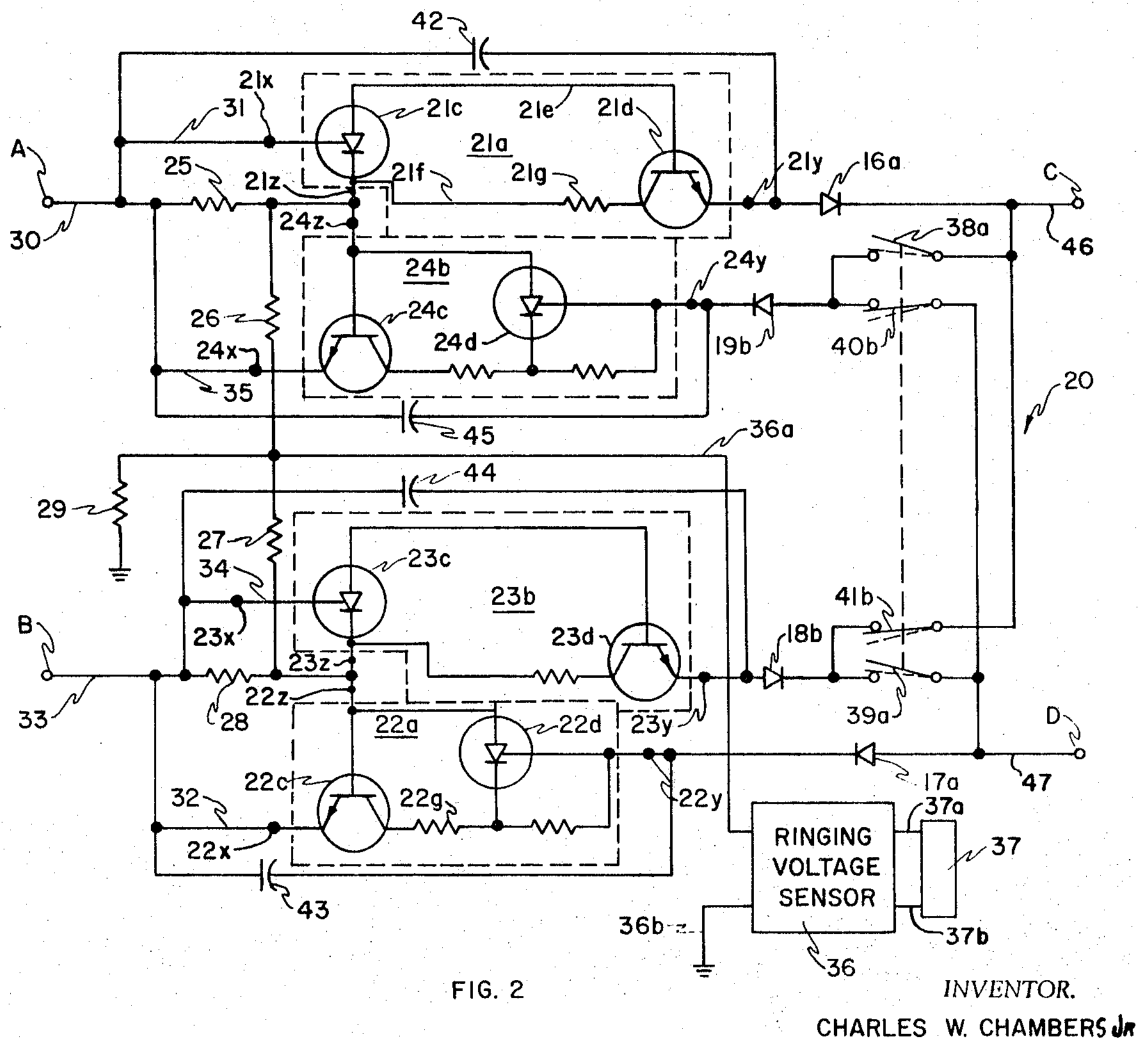

To the end that the foregoing may be accomplished, there is provided a polarity responsive switching circuit one illustrative embodiment of which is shown in FIG. 2. It will be understood that the circuitry of FIG. 2 is to be connected into a telephone system in the manner shown in FIG. 1, corresponding terminals being assigned the same letters in both Figures. In the present embodiment, the circuit of the invention includes a plurality of unidirectional conducting means **16*a* and 17*a* and 18*b* and 19*b* which here take the form of diodes, a mode control network 20 which here takes the form of a relay, and a plurality of controllable switching networks 21*a* and 22*a*, and 23*b* and 24*b*. The latter networks serve as switching elements having control circuits which are disposed in polarity sensing relationship to input terminals A and B and power circuits which are disposed in series, current control relationship to respective diodes. The power circuit of switching network 21*a*, for example, is disposed between junctions 21*x* and 21*y* which serve as power terminals and the control circuit thereof is disposed between junctions 21*x* and 21*z***, the latter junction serving as a control terminal.

As will presently be described more fully, when mode control means 20 is in a first operative state, that is in the solid line position shown in FIG. 2, diodes 16*a*, 17*a*, 18*b* and 19*b* are connected between terminals A, B, C and D in a rectifying configuration and cause the circuit of FIG. 2 to operate in a rectifying mode to provide a unidirectional DC voltage between output terminals C and D from the reversible DC voltage between input terminals A and B. When, however, mode control means 20 is in a second operative state, that is, in the dotted line position shown in FIG. 2 during ringing, diodes 16*a*, 17*a*, 18*b* and 19*b* are connected between terminals A, B, C and D in a nonrectifying configuration and cause the circuit of FIG. 2 to operate in a nonrectifying mode to permit the flow of AC ringing current through the circuit of FIG. 2. In both of the above modes switching networks 21*a*, 22*a*, 23*b* and 24*b* assure that the conductive states of the above diodes are controlled in accordance with the voltage at input terminals A and B and not in accordance with the voltage at output terminals C and D. This, in turn, assures that a DC boost voltage source connected between terminals C and D and a subscriber telephone set does not cause the uncontrolled conduction of the above mentioned diodes and the resultant effective short circuit between terminals C and D.

In order that diode 16*a* may conduct current from terminal A to terminal C through the power circuit of switching network 21*a*, the latter network includes trigger current conducting means which here takes the form of a thyristor 21*c* and latching current conducting means which here takes the form of an NPN transistor 21*d*. While transistor 21*d* is used in the usual transistor configuration with the base-emitter leads serving as the control circuit and the collector-emitter leads serving as the power circuit, thyristor 21*c* is not used in the usual controlled rectifier configuration. Instead, thyristor 21*c* is used as a transistor with the gate-cathode leads serving as the control circuit and the gate-anode leads serving as the power circuit.

Because a conductor 21*e* connects the power circuit of thyristor 21*c* in series with the control circuit of transistor 21*d* between power terminals 21*x* and 21*y*, the establishment of a control circuit current in thyristor 21*c* will cause the flow of a power current therethrough which will initiate a control current in transistor 21*d*. Similarly, because a conductor 21*f* connects the control circuit of thyristor 21*c* in series with the power circuit of transistor 21*d* between terminals 21*x* and 21*y* the above-initiated flow of control current in transistor 21*d* will cause the flow of a power current therethrough which will increase the control current flowing through thyristor 21*c*. It will be seen, therefore, that once conduction is initiated in the control circuit of thyristor 21*c*, the conduction of thyristor 21*c* and transistor 21*d* will increase regeneratively until terminal 21*x* is connected to terminal 21*y* as through a closed switch. A resistor 21*g* is provided to protect transistor 21*d* from excessive current.

Similarly, to the end that diode 17*a* may conduct current from terminal D to terminal B through the power circuit of switching network 22*a*, the latter network includes trigger current conducting means which here takes the form of an NPN transistor 22*c* and latching current conducting means which here takes the form of a thyristor 22*d*. This network operates in the manner described above with reference to switching network 21*a* to connect terminal 22*y* to terminal 22*x* as through a closed switch when a trigger current is initiated in the control circuit of transistor 22*c*. Similarly, switching network 23*b* includes a trigger current conducting device 23*c* and a latching current conducting device 23*d* for controlling the flow of current from terminal B to terminal C through diode 18*b* and switching network 24*b* includes a trigger current conducting device 24*c* and a latching current conducting device 24*d* for controlling the flow of current from terminal D to terminal A through diode 19*b*.

To the end that the conduction of diodes 16*a*, 17*a*, 18*b* and 19*b* may be controlled in accordance with the voltage at terminals A and B and not in accordance with the voltage at terminals C and D, the trigger current conducting means 21*c*, 22*c*, 23 *c* and 24*c* of switching networks 21*a*, 22*a*, 23*b* and 24*b* respectively, are connected, through the control circuits thereof, in polarity responsive relationship to terminals A and B through resistors 25 through 29. Thus, the respective trigger current conducting means of each switching network serves to control the conduction thereof in response to the voltage at terminals A and B.

When, for example, terminal A is positive from terminal B, current can flow from terminal A through conductors 30 and 31, the gate-cathode control circuit of trigger current conducting means 21*c*, resistors 26 and 27, the base-emitter control circuit of trigger current conducting means 22*c* and conductors 32 and 33 to terminal B. This current establishes conduction in switch means 21*a* and 22*a* and thereby allows the flow of a current from terminal A to terminal C through diode 16*a* and conductor 46 and a current from terminal D to terminal B through conductor 47 and diode 17*a*. Once the latter currents are established, the potential of terminal C becomes approximately equal to the potential of terminal A and the potential of terminal D becomes approximately equal to the potential of terminal B with the result that terminal C is positive from terminal D. Under these conditions the control circuits of transistor 24*c* and thyristor 23*c* are reversed biased thus preventing the conduction of switch means 23*b* and 24*b* and the resultant conduction of diodes 18*b* and 19*b*.

When, however, terminal B is positive from terminal A, current flows from terminal B through conductors 33 and 34, the gate-cathode control circuit of trigger current conducting means 23*c*, resistors 27 and 26, the base-emitter control circuit of trigger current conducting means 24*c* and conductors 35 and 30 to terminal A. This current establishes conduction in switch means 23*b* and 24*b* and thereby allows the flow of a current from terminal B to terminal C through diode 18*b* and a current from terminal D to terminal A through diode 19*b*. Once the latter currents are established, the potential of terminal D becomes approximately equal to the potential of terminal A and the potential of terminal C becomes approximately equal to the potential of terminal B with the result that terminal C is again positive from terminal D. Under these conditions the control circuits of thyristor 21*c* and transistor 22*c* are reverse biased thus preventing the conduction of switch means 21*a* and 22*a* and the resultant conduction of diodes 16*a* and 17*a*.

From the foregoing, it will be seen that despite reversals in the polarity of the voltage between input terminals A and B, a unidirectional DC voltage appears between output terminals C and D. Thus, the presence of switching networks 21*a*, 22*a*, 23*b* and 24*b* does not disturb the desired rectifying activity of diodes 16*a*, 17*a*, 18*b* and 19*b* which, taken together, serve as a bridge or full wave rectifier circuit having AC input terminals comprising the anodes of diodes 16*a* and 18*b* and the cathodes of diodes 17*a* and 19*b*, which are connected to terminals A and B through respective controllable switching means, and DC output terminals comprising the cathodes of diodes 16*a* and 18*b* and the anodes of diodes 17*a* and 19*b*, which are connected to terminals C and D.

If the above diodes were not connected to terminals A and B through respective switching networks but were instead connected thereto by a metalic connection, these diodes would provide an effective short circuit between terminals D and C when the voltage between the latter terminals was greater than the voltage between terminals A and B. This is because, under the last named condition, the voltage between terminals A and B would forward bias diodes 16*a* and 17*a* at the same time that the voltage between terminals D and C would forward bias diodes 18*b* and 19*b*. This would cause a portion of the current flowing away from the subscriber telephone set into terminal D to flow through diodes 17*a* and 18*b* to terminal C rather than continuing through to terminal B. The remaining current flowing through terminal D would flow directly to terminal C through diodes 19*b* and 16*a*. Since the conduction of these diodes would limit the voltage between terminals C and D to a value equal to the forward voltage drops of diodes 17*a* and 18*b* or diodes 19*b* and 16*a*, it is apparent that little or none of the voice signal originating at the subscriber telephone set would appear between terminals A and B.

The provision of switching networks 21*a*, 22*a*, 23*b* and 24*b* eliminates the above problem by preventing the voltage between terminals D and C from causing the conduction of any diode. This is because the conduction of the above switching means establishes the conduction or nonconduction thereof solely in accordance with the voltage at terminals A and B in the manner described previously with reference to the direction of current flow through resistors 26 and 27.

To the end that the control circuits of the trigger current conducting means 21*c*, 22*c*, 23*c* and 24*c* of the above described switching networks may be protected from excessive reverse voltages during those periods when the voltage at terminals A and B prevents conduction therein, those control circuits which are located on the same side of the line are connected in inverse parallel relationship. The control circuits of switching networks 21*a* and 24*b*, for example, are both connected across a resistor 25. As a result, when either control circuit is conducting, the other is reverse biased by a voltage equal to the forward voltage drip of the conducting control circuit. Resistor 25 sets the threshold voltage at which either control circuit will begin conduction.

In telephone systems in which ground start is utilized, it is necessary to establish a current in one side of the telephone line when the other side of the line is open circuited. In such systems, controlling the conduction of the switching network in accordance with the voltage across the line is not possible. Accordingly, it may be desirable to provide a resistor 29 between ground and resistors 26 and 27. This resistor will allow the flow of a control current through the control circuits of the switching networks which are located on the side of the telephone line that is to carry the ground start current even if the other side of the line is open circuited.

To the end that the rectifying activity of diodes 16*a*, 17*a*, 18*b* and 19*b* may be terminated when ringing current is to flow from the central office to PBX 11 or directly to telephone set 12, there is provided a ringing voltage sensing circuit 36 and a mode control means 20 responsive thereto. Because many well-known circuits are suitable for use as an AC voltage detector, sensing circuit 36 is shown in block form only. In the present embodiment mode control means 20 includes a relay having an actuator coil 37, a pair of normally open contacts 38*a* and 39*a* and a pair of normally closed contacts 40*b* and 41*b*, these contacts serving as off-on conducting means.

In the absence of ringing voltage, when sensing circuit 36 produces no output voltage on conductors 37*a* and 37*b*, relay coil 37 is deenergized and the contacts thereof are in the solid line positions shown in FIG. 2. Under these conditions, the circuitry operates in the previously described rectifying mode to provide a unidirectional DC voltage between terminals C and D. When, however, ringing voltage is present, sensing circuit 36 produces an output voltage on conductors 37*a* and 37*b* and relay coil 37 is energized causing the relay contacts to assume the dotted line positions shown in FIG. 2. Under the latter conditions, the circuitry operates in a nonrectifying mode, diodes 16*a* and 19*b* being effectively connected in inverse parallel relationship between terminals A and C and diodes 17*a* and 18*b* being effectively connected in inverse parallel relationship between terminals B and D. With the diodes in this configuration AC ringing current can flow freely between the central office and the PBX or the subscriber telephone set through either or both sides of the telephone line, depending upon whether divided or bridged ringing is utilized.

If, for example, there is utilized a divided ringing arrangement in which the ringing voltage generator is connected between ground and terminal A and the ringer of the subscriber is connected in series between terminal C and ground, one half-cycle of the ringing current will flow from terminal A to terminal C through switch means 21*a* and diode 16*a*. The other half-cycle thereof will flow from terminal C to terminal A through relay contact 38*a*, diode 19*b* and switch means 24*b*. In an arrangement of the above type the conduction of switch means 21*a* and 24*b* are controlled in accordance with the polarity of the voltage between terminal A and ground as manifested by the direction of current flow in resistors 26 and 29. It will be understood that a similar result would follow if ringing current were to be carried by the other side of the telephone line.

If, on the other hand, there is utilized a bridged ringing arrangement in which both the ringing voltage generator and the ringer of the subscriber are connected across their respective ends of the telephone line, one half-cycle of the ringing current will flow toward the subscriber through switch means 21*a* and diode 16*a* and will return through diode 17*a* and switch means 22*a*. The other half-cycle thereof will flow toward the subscriber through switch means 23*b* and diode 18*b* and will return through diode 19*b* and switch means 24*b*. In an arrangement of this type the conduction of the switching networks are controlled in accordance with the polarity of the voltage between terminal A and terminal B as manifested by the direction of current flow in resistors 26 and 27. Connecting the sensing leads 36*a* and 36*b* of sensing circuit 36 between the midpoint of the voltage divider comprising resistors 26 and 27 and ground allows the circuitry of FIG. 2 to operate without modification in telephone systems utilizing either divided or bridged ringing.

In circumstances where the ringing voltage is low, it may be advantageous to pass ringing current between terminals A and C and terminals B and D through a direct metallic connection. This will prevent attenuation of the ringing voltage due to voltage drops across switches 21*a*, 22*a*, 23*b* and 24*b* and the diodes in series therewith. The above metallic connection may be provided by connecting a first normally open contact between terminals A and C and a second normally open contact between B and D, these contacts being closed by relay coil 37 during ringing to bypass the ringing current around the switching circuitry of FIG. 2. If this is done, relay 20 may be replaced by a relay having only two sets of contacts.

The noise introduced into the telephone line by the switching activity of switch means 21*a*, 22*a*, 23*b* and 24*b* may be reduced by connecting respective filter capacitors 42, 43, 44 and 45 thereacross.

From the foregoing, it will be seen that a polarity responsive switching circuit constructed in accordance with the invention operates in a rectifying mode to provide a unidirectional DC output voltage (for talking) from a reversible DC input voltage, this rectification being accomplished solely in accordance with the input voltage even if the input voltage is less than the DC boost voltage which appears in series with the output thereof. It will further be seen that the switching circuit of the invention operates in a nonrectifying mode to transmit either divided or bridged ringing current therethrough when a mode control network is energized in the presence of ringing voltage.

It will be understood that the embodiment shown herein is for explanatory purposes only and may be changed or modified without departing from the spirit and scope of the appended claims.

What is claimed is:

1. In a polarity responsive switching circuit having a pair of input terminals and a pair of output terminals, in combination, a plurality of unidirectional conducting means, mode control means for connecting said unidirectional conducting means between the input and output terminals to establish at said output terminals a DC voltage having a fixed polarity when said mode control means is in a first operative state and for connecting said unidirectional conducting means between the input and output terminals to establish an AC voltage at said output terminals when said mode control means is in a second operative state, a plurality of controllable switching means, means for connecting said controllable switching means in series with respective unidirectional conducting means, means for controlling the conduction of said controllable switching means in accordance with the voltage at the input terminals, AC voltage sensing means, means for connecting said sensing means to the input terminals and means for connecting said sensing means to said mode control means to control the operative state of said mode control means in accordance with the presence and absence of AC ringing voltage at said input terminals.

2. A polarity responsive switching circuit as set forth in claim 1 in which said means for connecting said sensing means to the input terminals includes first and second sensing leads, a voltage divider, means for connecting said voltage divider across the input terminals, and means for connecting said sensing leads between ground and said voltage divider.

3. In a polarity responsive switching circuit having a pair of input terminals and a pair of output terminals, in combination, a rectifying circuit having AC input means and DC output means and including a plurality of unidirectional conducting means, means for connecting the AC input means of said rectifying circuit to the input terminals of the switching circuit, means for connecting the DC output means of said rectifying circuit to the output terminals of said switching circuit, a plurality of controllable switching means each having a power circuit and a control circuit, means for connecting the power circuits of said controllable switching means in series with respective unidirectional conducting means, means for connecting the control circuits of said controllable switching means to the input terminals of the switching circuit to control the conduction of said controllable switching means in accordance with the polarity of the voltage at said input terminals, said controllable switching means serving to prevent the uncontrolled conduction of said unidirectional conducting means when a source of DC voltage is connected in series with the output terminals of the switching circuit.

4. A polarity responsive switching circuit as set forth in claim 3 in which said means for connecting said control circuits to the input terminals includes resistance means and means for connecting said control circuits between the input terminals through said resistance means.

5. A polarity responsive switching circuit as set forth in claim 4 including means for connecting said resistance means to ground.

6. A polarity responsive switching circuit as set forth in claim 3 including ringing voltage sensing means, means for bypassing said rectifying circuit, means for connecting said bypassing means between the input and output terminals of the switching circuit, means for connecting said sensing means in bypass control relationship to said bypassing means and means for connecting said sensing means to the input terminals of the switching circuit.

7. In a polarity responsive switching circuit having a pair of input terminals and a pair of output terminals, in combination, a rectifying circuit having AC input means and DC output means and including a plurality of unidirectional conducting means, means for connecting the AC input means of said rectifying circuit to the input terminals of the switching circuit, means for connecting the DC output means of said rectifying network to the output terminals of the switching circuit, a plurality of controllable switching means each having first and second power terminals and a control terminal, means for connecting the power terminals of said switching means in series wit respective unidirectional conducting means, the power terminals of each of said switching means being disposed between the respective unidirectional conducting means and a predetermined one of the input terminals of the switching circuit, means for connecting the control terminal of each of said switching means to the other input terminal of the switching circuit, said switching means being arranged to control the flow of current through said unidirectional conducting means in accordance with the voltage at said input terminals.

8. A polarity responsive switching circuit as set forth in claim 7 in which each of said controllable switching means includes trigger current conducting means having a power circuit and a control circuit, latching current conducting means having a power circuit and a control circuit, means for connecting the control circuit of said trigger current conducting means in series with the power circuit of said latching current conducting means between said first and second power terminals, means for connecting the control circuit of said latching current conducting means in series with the power circuit of said trigger current conducting means between said first and second power terminals and means for connecting the control circuit of said trigger current conducting means to said control terminal.

9. In a polarity responsive switching circuit having a pair of input terminals and a pair of output terminals, in combination, a plurality of unidirectional conducting means, mode control means for connecting said unidirectional conducting means to one another to establish a bridge rectifying circuit when said mode control means is in a first operative state and for connecting said unidirectional conducting means to one another to establish a plurality of pairs of inverse parallel connected unidirectional conducting means when said mode control means is in a second operative state, means for connecting said bridge rectifying circuit to said input and output terminals to provide a unidirectional DC voltage at said output terminals when said mode control means is in said first state, means for connecting said inverse parallel connected pairs of unidirectional conducting means to said input and output terminals to provide paths for the flow of AC current therebetween when said mode control means is in said second state, a plurality of controllable switching means, means for connecting said switching means in series with respective unidirectional conducting means, means for connecting said switching means in polarity responsive relationship to said input terminals, AC voltage sensing means for establishing the first operative state of said mode control means in the absence of an AC voltage between said input terminals and for establishing the second operative state of said mode control means in the presence of an AC voltage between said input terminals, and means for connecting said AC voltage sensing means to said input terminals.

10. In a polarity responsive switching circuit having a first and a second input terminal and a first and a second output terminal, in combination, first controllable switching means for conducting current from said first input terminal to said first output terminal, second controllable switching means for conducting current from said second output terminal to said second input terminal, third controllable switching means for conducting current from said second input terminal to said first output terminal, fourth controllable switching means for conducting current from said second output terminal to said first input terminal, a plurality of unidirectional conducting means, means for connecting said unidirectional conducting means in series with respective switching means, means for energizing said first and second switching means when said first input terminal is positive from said second input terminal and for energizing said third and fourth switching means when said second input terminal is positive from said first input terminal.

11. A polarity responsive switching circuit as set forth in claim 10 including means for bypassing AC current between said first input terminal and said first output terminal and for bypassing AC current between said second input terminal and said second output terminal, ringing voltage sensing means, means for connecting said sensing means in bypass control relationship to said bypassing means and means for connecting said sensing means to said input terminals.

12. In a polarity responsive switching circuit having a pair of input terminals and a pair of output terminals, in combination, a plurality of unidirectional conducting means, means for connecting one terminal of each of said unidirectional conducting means to one of said output terminals, predetermined ones of said last named connecting means including off-on conducting means, a plurality of controllable switching means for connecting the other terminal of each of said unidirectional conducting means to one of said input terminals, actuator means for controlling the conductivity of said off-on conducting means, sensing means for controlling said actuator means in accordance with the presence of an AC voltage at said input terminals, means for connecting said sensing means to said input terminals, said unidirectional conducting means providing a unidirectional DC voltage at said output terminal means when said off-on conducting means is in a first operative state in the absence of AC voltage at said input terminals, and providing an AC voltage at said output terminal means when said off-on conducting means is in a second operative state, in the presence of AC voltage at said input terminals, means for energizing predetermined ones of said switching means when the voltage between said input terminals has one polarity and for energizing predetermined other ones of said switching means when the voltage between said input terminals reverses polarity.

* * * * *